(12) United States Patent
Kumar et al.

(10) Patent No.: US 12,292,880 B2
(45) Date of Patent: May 6, 2025

(54) SYSTEMS AND METHODS FOR ZERO DOWNTIME DISTRIBUTED SEARCH SYSTEM UPDATES

(71) Applicant: Stripe, Inc., South San Francisco, CA (US)

(72) Inventors: Ritesh Kumar, South San Francisco, CA (US); Susindaran Elangovan, South San Francisco, CA (US); Priyanka Raju, South San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 17/899,381

(22) Filed: Aug. 30, 2022

(65) Prior Publication Data
US 2023/0061088 A1  Mar. 2, 2023

Related U.S. Application Data

(60) Provisional application No. 63/239,644, filed on Sep. 1, 2021.

(51) Int. Cl.
*G06F 15/16* (2006.01)
*G06F 8/65* (2018.01)
(Continued)

(52) U.S. Cl.
CPC ............ *G06F 16/2379* (2019.01); *G06F 8/65* (2013.01); *G06F 11/1464* (2013.01); *G06F 12/0269* (2013.01)

(58) Field of Classification Search
None
See application file for complete search history.

(56) References Cited

U.S. PATENT DOCUMENTS

2008/0046400 A1  2/2008  Shi et al.
2008/0098046 A1  4/2008  Alpern et al.
(Continued)

FOREIGN PATENT DOCUMENTS

CN  109814905 A  5/2019

OTHER PUBLICATIONS

Brewer. Lessons from Giant-Scale Services. IEEE Internet Computing, 2001, pp. 46-55. (Year: 2001).*

(Continued)

*Primary Examiner* — Alex Gofman
*Assistant Examiner* — Shelly X Qian
(74) *Attorney, Agent, or Firm* — Foley & Lardner LLP

(57) ABSTRACT

A method and apparatus for performing search system upgrades is described. The method may include processing a software upgrade for a search system cluster distributed over one or more nodes, the one or more nodes comprising current search system data nodes. The method may also include allocating at least a set of one or more search system data nodes for the software upgrade including at least one upgraded search system data node. Furthermore, the method can include receiving, during the software upgrade, transaction data for a transaction, and receiving search requests to be executed by the search system cluster. Additionally, the method may include performing ingestion of all received transaction data comprising storing and indexing the transaction data in both the current search system data nodes and the at least one upgraded search system data node, and processing the search requests by the search system cluster against the current search system data nodes until the software upgrade is determined to be complete.

20 Claims, 6 Drawing Sheets

(51) Int. Cl.
*G06F 11/14* (2006.01)
*G06F 12/02* (2006.01)
*G06F 16/23* (2019.01)

(56) References Cited

U.S. PATENT DOCUMENTS

| | | |
|---|---|---|
| 2010/0162226 A1 | 6/2010 | Borissov et al. |
| 2014/0173566 A1 | 6/2014 | Hsu et al. |
| 2015/0161182 A1 | 6/2015 | Baeuerle et al. |
| 2018/0039494 A1* | 2/2018 | Lander .................. H04L 45/02 |

OTHER PUBLICATIONS

Trotman et al. The Architecture of eBay Search. SIGIR 2017 eCom workshop, pp. 1-7. (Year: 2017).*
Saur et al. Evolving NoSQL Databases Without Downtime. IEEE International Conference on Software Maintenance and Evolution. 2016, pp. 166-176. (Year: 2016).*
Nielsen. Putting A/B Testing in Its Place. 2005, pp. 1-5. https://www.nngroup.com/articles/putting-ab-testing-in-its-place/. (Year: 2005).*
International Search Report and Written Opinion on the Patentability of Application No. PCT/US2022/042358 Mailed Dec. 23, 2022, 8 pages.
European Search Report on European Application No. 22865562.7-1203 dated Oct. 25, 2024 (11 pages).

* cited by examiner

SYSTEMS AND METHODS FOR ZERO DOWNTIME DISTRIBUTED SEARCH SYSTEM UPDATES

PRIORITY

The present application claims the benefit of, and is a non-provisional patent application of, U.S. Provisional Patent Application 63/239,644, filed on Sep. 1, 2021.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the merchant transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

Often, such merchants will seek to access records of the various transactions processed by the commerce system. Based on the records that the merchants seek to access, they employ search services provided by the commerce system, such as structured queries transmitted via an API interface, search queries entered into search bars in user interfaces provide by the commerce system (e.g., web based search), or via other interfaces provided by the commerce platform in which a merchant can submit search queries. The merchants trust that the search is executed against a trustworthy set of data using the most up-to-date and reliable version of the search system. Furthermore, merchants expect that they may search the commerce platform for merchant information at any time, with zero downtime.

To ensure that the most stable and most efficient version of the search services are provided to the merchant, the commerce system will periodically install upgrades to the software systems that execute the search services. For example, commerce platform will install software updates to the search services to fix bugs, provide enhanced search capabilities, improve data storage efficiency, provide for more efficient indexing, increase the speed at which search results are returned, as well as for other reasons. The upgraded search services typically are the result of a software upgrade applied to the systems executing the search services software applications, such as one or more computer server systems executing the search services.

However, during an upgrade, the search services may be unavailable to merchants, which is not acceptable in a zero downtime deployment, and as would be expected by merchants. Furthermore, during an upgrade, the commerce platform continues to process merchant transactions. These transactions that occur during a software upgrade may not be ingested by the search system for search by a merchant, or may be unacceptably delayed, which results in an incomplete data set upon which search is performed. Therefore, there exists technical challenges as to how to perform upgrades to search systems deployed by a real-time transaction processing system (e.g., the commerce platform) with zero search system downtime while providing real-time or near real-time accuracy as to the corpus of searchable transaction information.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
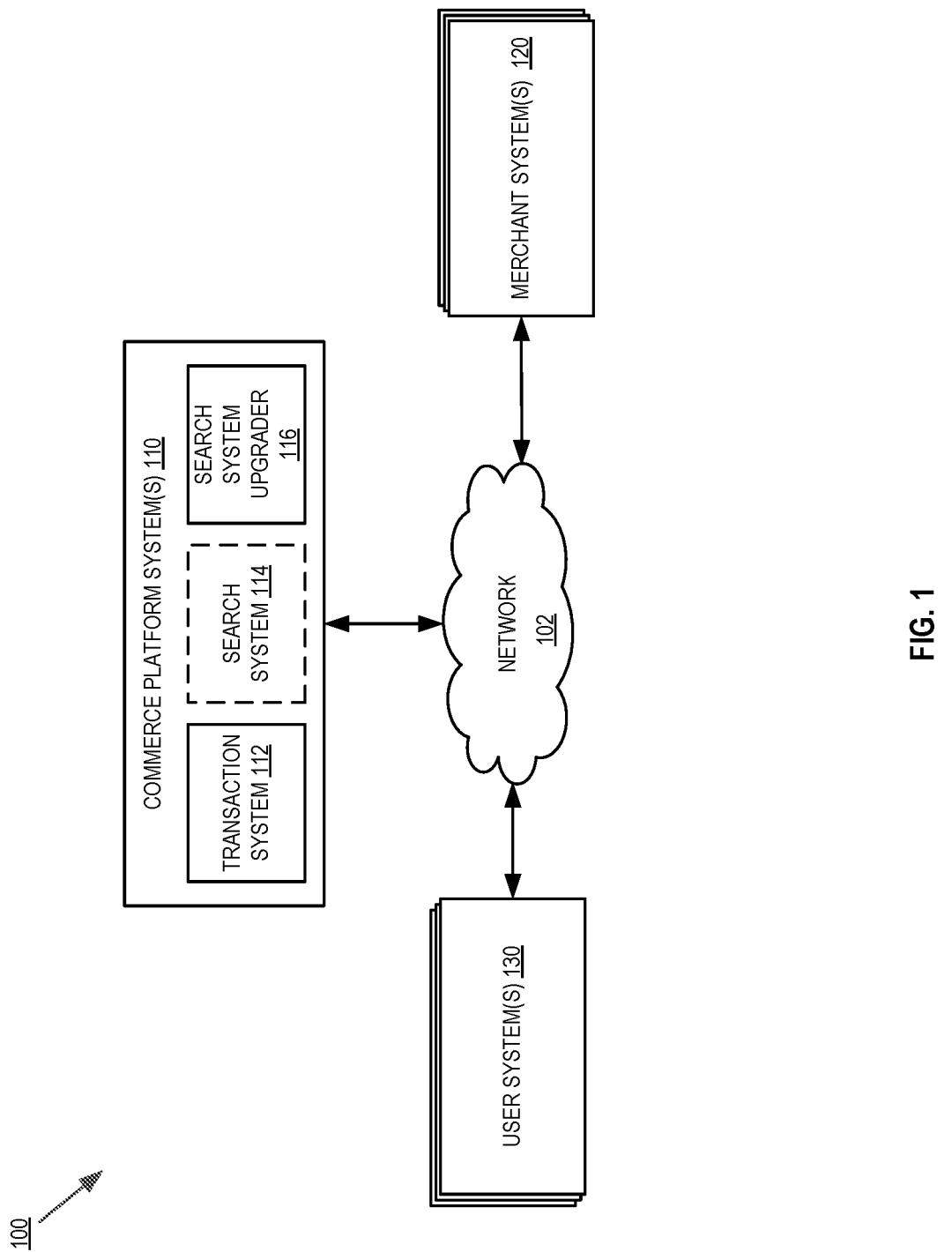
FIG. 1 is a block diagram of an exemplary system architecture for a commerce platform system performing zero downtime search system upgrades.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "allocating", "receiving", "performing", "decommissioning", "detecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for auditing search system data by a commerce platform system. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems providing search features to its customers. Furthermore, any other type of system seeking to perform zero downtime search system upgrades may employ the techniques discussed herein. However, to avoid obscuring the embodiments discussed herein, a commerce platform system providing network based commercial transactions and search of such transactions is discussed to illustrate and describe the embodiments of the present invention, and is not intended to limit the application of the techniques described herein from applicability to other systems.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions initiated at user system(s) 130 performed on behalf of a merchant system 120, clear transactions, performing payouts to merchant and/or merchant agents, manage merchant and/or agent accounts held at the commerce platform system(s) 110, as well as other services typically associated with commerce platforms systems such as, for example, STRIPE™. Each of these transactions is processed by the transaction system 112 of commerce platform system(s) 110 in real time or near real time, and data associated with the transaction is stored in a data store of the commerce platform system (e.g., transaction data store 212 illustrated in FIGS. 2A and 2B). That is, the commerce platform system(s) keeps a record of the transactions, the details of the transaction, and unique identifiers generated by the transaction system 112 for each individual transaction.

In embodiments, the transaction system 112, or another subsystem of commerce platform systems(s) 110 (not shown), provides transaction data to the search system 114. The search system, 114 in embodiments is a real-time distributed search system, such as ELASTICSEARCH™, SOLR™, as well as other search systems. The search system 114 is illustrated in dashed line because in embodiments, the search system is executed at server computer systems of the commerce platform system(s) 110. However, in embodiments, search system 114 may be a remotely hosted search system by a third party, such as the developer and distributor of the search system, a cloud storage and computing system provider executing and/or hosting the search system, third party systems providing full or partially managed implementations of the search system, etc. In each embodiment, the transaction data provided by transaction system 112 to search system 114, which may represent a transaction record, a transformed transaction record, etc., and include data associated with the transaction (e.g., transaction type, transaction parties, one or more identifiers for the transaction, merchant system identifiers, user identifiers, unique internal commerce platform system identifiers, etc.), is provided to the search system 114. The search system is responsible for ingesting the transaction data for purposes of indexing and storing the transaction data for search purposes, as discussed in greater detail herein. In embodiments, the search system 114 is referred to as real-time because the search system ingests the transaction data, updates the search system indexes, and stores the data in a searchable form in real time or near real time. Furthermore, additional types of documents or data may be provided to the search system for search purposes (e.g., support documentation, other types of merchant records, tax information documents, etc.).

Furthermore, in embodiments, commerce platform system 110 may provide an interface to merchant system(s) 120 and/or user system(s) 130 to search the transaction data using the search services of search system 114. For example, commerce platform system 110 may provide web based graphical user interfaces (e.g., client management portals) with search features such as search bars enabling natural language and/or structured queries of a merchant's or user's transaction data. Other interfaces, such as application programming interfaces (API) may expose search features of the commerce platform system 110 to the merchant system(s) 120 and/or user system(s) 130 to enable communication of search queries via communication with API endpoints of the commerce platform system(s) 110.

In embodiments, search system 114 is subject to periodic upgrades to the software executing the search services. For example, upgrades may fix bugs within the search system, increase efficiency with which search results are returned, change data formatting of stored data distributed among search system nodes to improve data storage efficiency, change index formatting to increase search and or data utilization efficiency, or otherwise improve the functionality, stability, and efficiency of the search system 114. Thus, to take advantage of these upgrades, and improve the operation of the search system 114 to improve the search system performance and/or search results, search system upgrader 116 is responsible for installing software upgrades to the search system 114 on a periodic basis. In embodiments, search system upgrader 116 is configured to execute one or more scripts, or other automation methods, to obtain a search system software update (e.g., a software package for performing a software upgrade), initiate the zero downtime operations discussed below, and perform the software update. Furthermore, in embodiments, the search system upgrader 116 may further perform search result coherency analysis to ensure that an upgraded search system is providing accurate search results, before the upgraded search system is enabled to provided results to merchant systems.

In one embodiment, search system upgrader 116 is configured to install search system software upgrades in a manner which ensures zero downtime, and accurate search of an upgraded search system. Zero downtime, as referred to herein, means that there is no downtime for search to ensure a merchant system's ability to search against their transaction records and for other commerce platform system 110 information remains uninterrupted even while an upgrade is being processed, as discussed in detail below. Furthermore, zero downtime also means that there is no ingestion downtime for adding new transaction information to the search system (e.g., no downtime for indexing and storing data). Thus, the search system 114, even while being upgraded, is both available for performing search and reflects a real-time or near real-time state of the commerce platform system's 110 searchable information.

As will be discussed in greater detail below, search system upgrader 116 enables zero downtime search system 114 upgrades, in an embodiment, utilizing a dual search system cluster approach. In another embodiment, search system upgrader 116 enables zero downtime search system 114 upgrades utilizing an in-place upgrade with dual search system data node(s). Each of these embodiments for providing zero downtime search system upgrades is discussed in greater detail below.

Figure 2A:
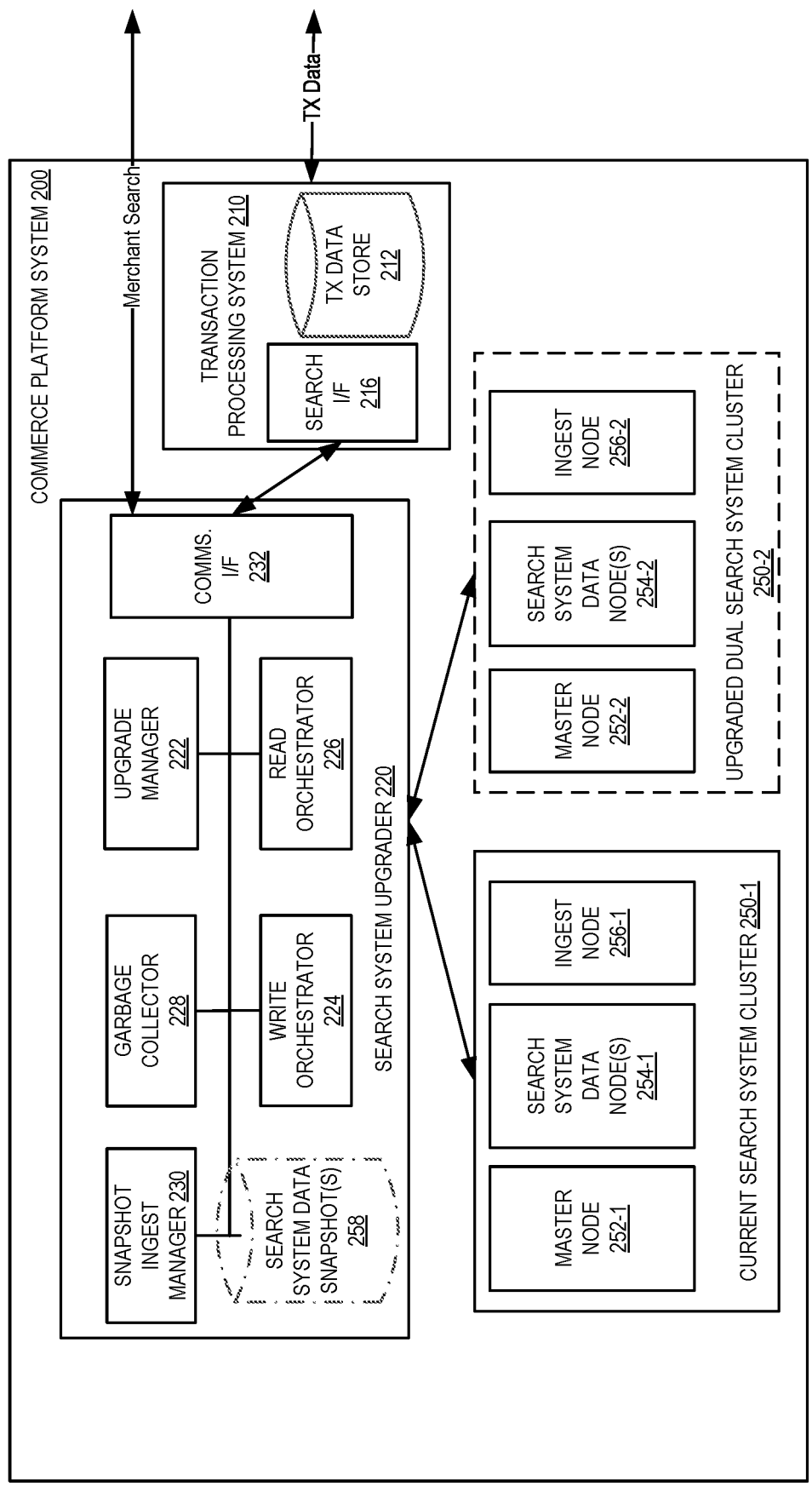
FIG. 2A is a block diagram of one embodiment of a commerce platform system for performing search system upgrades.

FIG. 2A is a block diagram of one embodiment of a commerce platform system 200 for performing search system upgrades. Commerce platform system 200 provides additional details for the commerce platform system(s) 110 discussed above in FIG. 1.

In one embodiment, commerce platform system 200 includes a transaction processing system 210 and a search system upgrader 220. In embodiments, commerce platform system 200 further includes a current search system cluster 250. Additionally, in response to upgrader 220 performing a zero downtime upgrade, commerce platform system 200 may also include an upgraded dual search system cluster 250-2. However, in embodiments, the search system clusters 250-1 and/or 250-2 may be maintained at a remote system from the commerce platform system, and accessed by the commerce platform system using one or more APIs of a search system provider, such as those provided by ELASTICSEARCH™, SOLR™, or other search systems.

In embodiments, transaction processing system 210 is responsible for receiving and processing transactions originating from merchant system(s) (not shown) and user system(s) (not shown) over a network (e.g. network 102). For example, the transactions may be financial transactions performed by payments systems including, but not limited to, purchases, refunds, credit requests, subscriptions, etc. Transaction processing system 210 maintains a transaction data store 212 for the transaction records of each merchant and/or user which uses the services of the commerce platform system 210. The data store 212 may include financial books providing account balances, records of transactions, account status, tax information, as well as other merchant information. It should be noted that some transactions, such as deletions, reversals, etc. may change, remove, add, or otherwise change the data within transaction data store, and consequently within the searchable data of search system clusters.

In embodiments, transaction processing system 210 includes a search system interface 216 that executes one or more search system APIs to communicate transactions from the transaction data store 212 to the communications interface 232 of the search system upgrader 220. The transactions and associated data are then communicated by the communications interface 232 to a search system cluster by write orchestrator 224 for ingestion into the search system, as discussed in greater detail below. The transaction data may be transformed by the search interface 216 and/or write orchestrator 224 prior to communication, such as extracting a subset of data, formatting the data, constructing an API based message, etc. to communicate the transaction data (e.g., identifiers, details, metadata, etc.) to a search system cluster.

Current search system cluster 250-1, as discussed herein, is an implementation of a search system enabling search of transaction data of the commerce platform system 200. In embodiments, current search system cluster 250-1 is an ELASTICSEARCH™ cluster, SOLR™ cluster, or other search system cluster that performs distributed data storage and indexing in real-time or near real-time as transaction data is received. That is, current search system cluster 250-1 provides for document (e.g., transaction data) ingestion, and distribution of the transaction data and indexes among nodes within the cluster. The index maintained by the current search system cluster 250-1 is a distributed index and supports structured and natural language searches across the distributed documents and indexes.

Current search system cluster 250-1 includes several nodes that may be distributed among computing systems. The nodes include a master node 252-1 that is responsible for cluster-wide management and configuration (e.g., adding and deleting nodes, configuring backups, replication, etc.), search system data node(s) 254-1 that are responsible for storing data (e.g., searchable transaction data, index shards, etc.) and executing data related operations such as performing structured or unstructured searches, indexing, aggregating data, etc., and ingest node 256-1 which is responsible for pre-processing received transaction data from the write orchestrator 224 before indexing. Thus, the distributed nodes of current search system cluster 250-1 provide for a fully functional distributed search system enabling commerce platform system's 200 users to search their relevant transaction data.

In embodiments, upgrade manager 222 is responsible for detecting when a search system software upgrade becomes available (e.g., by a system that is responsible for distributing and updating the search system), and managing the execution of that update. For example, upgrade manager 222 may periodically send update availability requests to a search system provider, monitor web pages for information indicating upgrade availability, or receive an affirmative command from a commerce platform system 200 user indicating where a software upgrade that should be installed in located.

In response to initiating a software update to a search system, upgrade manager 222 allocates a second search system cluster using the upgraded search system software, illustrated as upgraded dual search system cluster 250-2. By allocating the upgraded dual cluster 250-2, the master node 252-2, search system data node(s) 254-2 and ingest node 256-2 are each allocated with the upgraded search system software version. That is, the newly allocated upgraded dual search system cluster 250-2 is a search system cluster that executes an upgraded version of search system software, while current search system cluster 250-1 executes a prior version of search system software. Furthermore, in embodiments, the search system APIs executed by each of upgrade manager, garbage collector 228, write orchestrator 224, read orchestrator 226, and snapshot ingest manager 230 to communicate with search system clusters, as discussed below, may also be updated.

In embodiments, search system cluster updates are configured by the search system to provide version-1 compatibility. That is, both current search system cluster 250-1 and upgraded dual search system cluster 250-2 are each capable of receiving search system API based communications for an upgraded version of search system software. However, with version-1 compatibility, a search system version that is two or more versions older than a newest version are not guaranteed by the search system to be supported.

Following allocation of the upgraded dual search system cluster 250-2 at time $T_0$ (e.g., when upgraded dual search system cluster 250-2 is operational), upgrade manager 222 configures write orchestrator 224 to communicate new transaction data to each of ingest node 256-1 and 256-2. That is, write orchestrator 224 is configured to perform dual writes of any newly received transaction data to each ingest node (e.g., 256-1 and 256-2) from time $T_0$ until an upgrade is confirmed by upgrade manager 222. By performing dual writes, each of the current and upgraded search system clusters maintains the same search system data from time $T_0$, and such data is searchable using each cluster. Thus, both the search system clusters are accurate with respect to transaction data from time $T_0$. However, upgraded dual search system cluster 250-2 is not yet ready to support search as it does not have historical transaction data for transactions occurring before $T_0$.

In embodiments, search system upgrader 220 may further include search system data snapshot(s) 258. In embodiments, the snapshots may be maintained by upgrader 220. However, the snapshots may also be stored remotely at, for example, a search system cluster, a cloud storage provider, or other storage location accessible to the search system clusters 250-1 and 250-2, and search system upgrader 220, and are therefore illustrated in FIG. 2A using dashed and dotted lines. Search system data snapshot(s) 258 is a data store that stores a state of search system data at various points of time, such as hourly, every 12 hours, daily, etc. The snapshots may include just underlying searchable data (e.g., transaction data), but may also include search indexes, sufficient data to back up a cluster, a complete cluster copy, etc. Furthermore, given the distributed nature of the search system cluster data node(s), in embodiments, the snapshots may join the data into a single piece of data for data storage efficiency.

In embodiments, to account for historical transaction data, upgrade manager 222 therefore configures snapshot ingest manager 230 to feed historical transaction data from search system data snapshot(s) 258 to ingest node 256-2. That is, snapshot ingest manager 230 provides the history of transaction data as writes, updates, etc. to ingest node 256-2 so that ingest node may pre-process, index, and distribute data among search system data node(s) 254-2. This process of ingesting historical transaction data (e.g., transactions occurring at time $T_H < T_0$) can be thought of as brining the upgraded dual search system cluster up to date, while at the same time ingesting all new transaction data from time $T_0$ on (e.g., transactions occurring at time $T_N >= T_0$).

In embodiments, upgrade manager 222 further configures read orchestrator 224 to forward any received merchant search to current search system cluster 250-1 for performing search until snapshot ingest manager 230 finishes transmission of all historical transaction data. Thus, as upgraded dual search system cluster 250-2 is brought up to date (e.g., with all historical transaction data and all data new transaction data), current search system cluster 250-1 continues to handle merchant search. This is because of the dual writes performed by write orchestrator 224 ensuring that current search system cluster 250-1 is also up to date with all transaction data received after time $T_0$.

In embodiments, write orchestrator 224 is further configured to transform received deletion requests to an insertion request. However, the transformed insertion request is further configured to add a deletion flag to each record maintained by clusters 250-1 and 250-2. That is, a deleted transaction record from the historical information within search system data snapshot(s) 258 would not show up in the data node(s) 254-2 of upgraded search system cluster 250-2 since it was deleted. Thus, the state of data node(s) 254-2 would not reflect accurately on the transaction information and may not return accurate search results from cluster 250-2. However, by adding deletion flags to each record, even deleted records may be added to upgraded dual search system cluster 250-2. Then, upon completion of snapshot ingest manager's 230 sending of historical transaction information to ingest node 256, garbage collector 228 may be triggered to search for and remove all deleted records from upgraded dual search system cluster 250-2.

In one embodiment, upon completion of the garbage collector's 228 removal of items flagged for deletion from upgraded dual search system cluster 250-2, write orchestrator 224 may be reconfigured to send new transaction records only to ingest node 256-2. Similarly, any newly received merchant search may be sent from read orchestrator 226 to upgraded dual search system cluster 250-2. That is, search responsibility is handed over from the current cluster 250-1 to the upgraded dual cluster 250-2.

However, in embodiments, prior to turning search responsibility over to the upgraded dual cluster 250-2, upgrade manager 222 initiates a search accuracy confirmation process by configuring read orchestrator 226 to perform dual reads (e.g., searches) from each of clusters 250-1 and 250-2 in response to merchant search. During the accuracy confirmation process, however, only search results returned from current search system cluster 250-1 are returned in response to the merchant search. However, the search results returned from upgraded dual search system cluster 250-2 and current search system cluster 250-1 are compared by upgrade manager 222 for a period of time, a number of searches, etc. to confirm that search results match within an accuracy threshold. That is, search may be for specific records, where a search result should match exactly. Additionally, search results may include more than one result in a ranked listing. Thus, in embodiments, upgrade manager 222 may determine that search results match when specific records match, when a predetermined number of results within a ranked search result match, or a combination thereof. When upgrade manager 222 determines that a sufficient number of matches are obtained, a sufficient time of successful matching results has passed, etc., upgrade manager may hand over search responsibility from the current cluster 250-1 to the upgraded dual cluster 250-2, as discussed above, and the current search system cluster 250-1 is decommissioned (e.g., deallocated). However, if accuracy of the upgraded cluster 250-2 cannot be verified, the upgraded dual search system cluster 250-2 can be decommissioned, and the upgrade process re-initiated, as discussed below.

Therefore, in the embodiment, discussed above, search system upgrader 220 provides for zero downtime and accuracy confirmed upgrading of a distributed search system cluster. Zero downtime, as discussed herein, includes zero read downtime (e.g., no search downtime), as the current version of a search system is maintained and updated in real time for handling search requests until an upgrade can be completed and accuracy verified. Furthermore, there is zero ingest downtime, (e.g., no delay in writing new data to search system), as both the current software version and upgraded software version ingest transaction data received after initiation of the upgrade. Additionally, accuracy is confirmed over a number of searches to ensure that the upgraded search system cluster 250-2 performs as expected prior to using it to return search results to merchants.

Figure 2B:
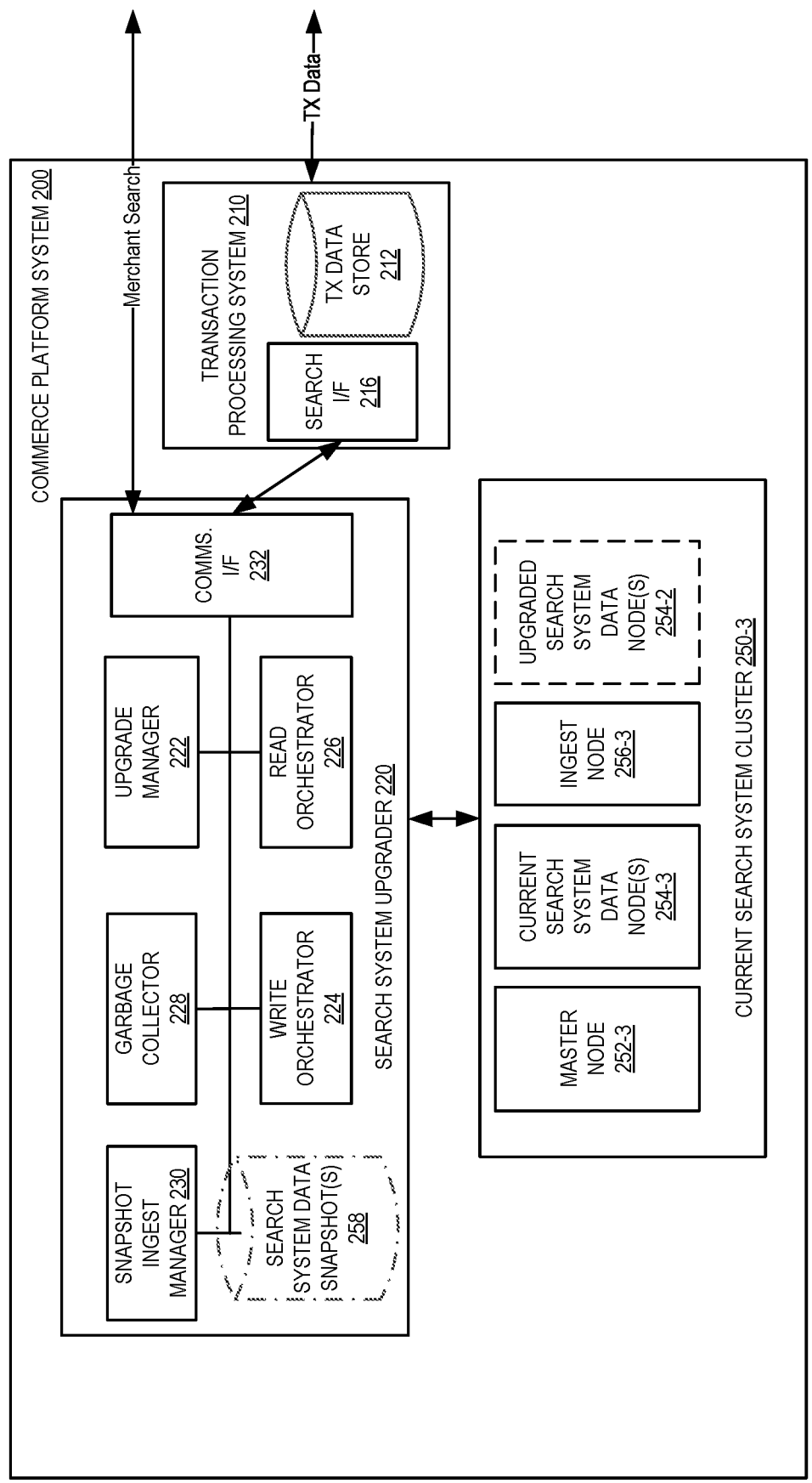
FIG. 2B is a block diagram of another embodiment of a commerce platform system for performing search system upgrades.

FIG. 2B is a block diagram of another embodiment of a commerce platform system 200 for performing search system upgrades. Commerce platform system 200 includes the search system upgrader 220 and a transaction processing system 210, as discussed above in FIG. 2A. However, in FIG. 2B, upgrade manager 222 utilizes an in-place upgrade of the current search system cluster 250-3.

In the embodiment illustrated in FIG. 2B, upon detecting a software update, upgrade manager installs the updated search system software on the master node 252-3 and ingest node 256-3 of the current search system cluster 250-3. As discussed above, since search system software updates support version-1, master node 252-3 and ingest node 256-3 remain compatible with current search system data node(s) 254-3. That is, even though the software of master node 252-3 and ingest node 256-3 are upgraded, they may still be used to ingest, search, etc. using data node(s) 254-3.

In response to the upgrade, upgrade manager 222 causes current search system cluster 250-3 to allocate upgraded search system data node(s) 254-2. The upgraded search system data node(s) 254-2 are data nodes utilizing the formatting, organization, data storage, etc. defined by the updated search system software. Furthermore, the time at which the upgraded search system data node(s) 254-2 are allocated may be considered time $T_0$, as discussed above in FIG. 2A. Once the in-place upgraded search system data node(s) 254-2 is allocated at time $T_0$, then the operations discussed in FIG. 2A above may be performed (e.g., dual write orchestration, deletion transformation, garbage collection, dual read orchestration for search results consistency verification, etc.) with respect to the current and upgraded data node(s) 245-3 and 254-2. Then, when the upgraded data node(s) 254-2 are determined to provide accurate search results, then current data node(s) 254-3 may be decommissioned, as discussed above.

Figure 3:
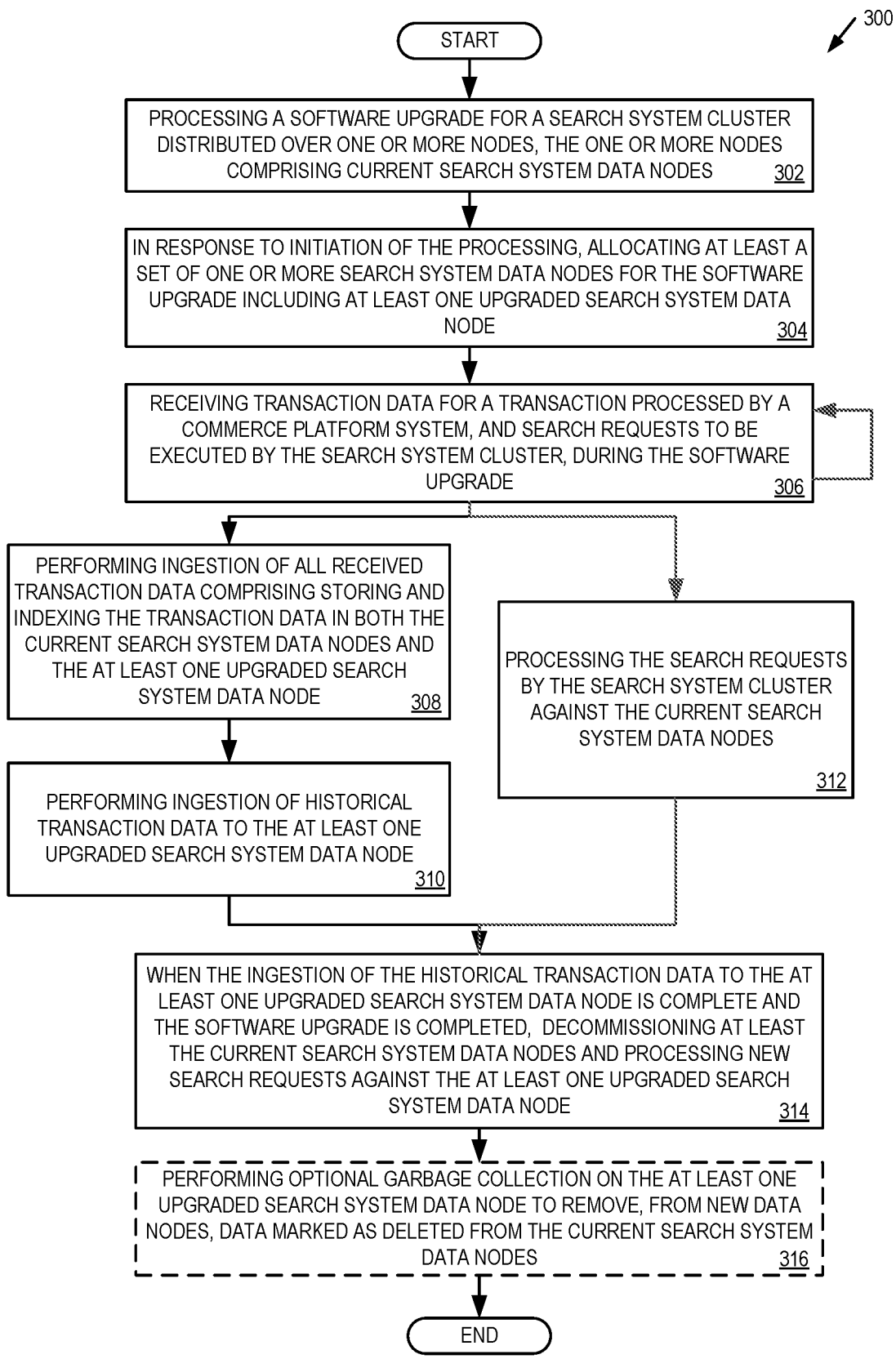
FIG. 3 is a flow diagram of one embodiment of a method for performing search system upgrades with zero downtime.

FIG. 3 is a flow diagram of one embodiment of a method 300 for performing search system upgrades with zero downtime. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3, processing logic begins by processing a software upgrade for a search system cluster distributed over one or more nodes, the one or more nodes comprising current search system data nodes (processing block 302). As discussed herein, the nodes may include a master node, an ingest node, and one or more data nodes that operate to provide search results of at least commerce platform system transaction data. Furthermore, the nodes may be distributed over one or more computer processing systems of the commerce platform system, controlled by the commerce platform system, or accessible to the commerce platform system.

In response to initiation of the processing, processing logic allocates at least a set of one or more search system data nodes for the software upgrade including at least one upgraded search system data node (processing block 304). As discussed herein, in an embodiment, allocation may include allocating an entire search system cluster that includes the upgraded search system data node, upgraded master node, and upgraded ingest node. In another embodiment, the upgraded search system data node may be allocated in-place within a current search system cluster.

Processing logic then receives transaction data for a transaction processed by a commerce platform system, and search requests to be executed by the search system cluster, during the software upgrade (processing block 306). In embodiments, commerce platform is a high volume real-time transaction processing system. Thus, while the software upgrade is being processed (e.g., installed, verified, accuracy checked, etc.), the commerce platform system does not stop generating new transaction records to be ingested for search, and further may receive new merchant system searches.

Processing logic therefore, performs ingestion of all received transaction data comprising storing and indexing the transaction data in both the current search system data nodes and the at least one upgraded search system data node (processing block 308). That is, a dual write operation is orchestrated by processing logic so that each set of data node(s) is updated with new transaction data. Furthermore, in embodiments, the upgraded search system data node may be updated within an upgraded cluster, or in-line with a current cluster.

Processing logic further performs ingestion of historical transaction data to the at least one upgraded search system data node (processing block 310). In embodiments, the ingestion of historical transaction data is performed by processing logic to bring the newly allocated upgraded search system data node up to date, while in parallel, enabling the upgraded search system data node to ingest new transaction data. Thus, both the current search system data node(s) and the at least one upgraded search system data node are updated with the latest transaction data, while at the same time the upgraded search system data node is brought up to date through ingestion of historical transaction data.

In parallel with the ingestion of data in blocks 308 and 310, processing logic further processes the search requests by the search system cluster against the current search system data nodes (processing block 312). That is, as the upgraded search system data node, and in embodiments an upgraded cluster, are brought up to date, searches may be handled by the non-upgraded current cluster.

When the ingestion of the historical transaction data to the at least one upgraded search system data node is complete and the software upgrade is completed, processing logic decommissions at least the current search system data nodes and processes new search requests against the at least one upgraded search system data node (processing block 314). After ingesting the historical data, while at the same time ingesting all new transactions received after allocation, the at least one upgraded search system data node includes all data that the current search system data node(s) includes (e.g., data, indexes, etc.). Thus, the at least one upgraded search system data node is capable of handling and responding to merchant search, and the older version search system nodes may be decommissioned (e.g., deallocated). Furthermore, as discussed herein, and as discussed with reference to FIG. 4, a consistency check may be performed prior to the decommissioning to ensure that the at least one upgraded search system data node is ready for accurate operation.

Furthermore, as discussed above, in some embodiments, data writes (e.g., blocks 308 and 310) to search system data nodes may include deletion requests. To ensure coherency of data across current and upgraded search system nodes, in embodiments, deletion requests may be transformed to insertions by processing block 308. However, the transformation to an insertion further adds a deletion flag to the associated data, and an indication that the deletion flag is true (e.g., indicating the associated transaction data has been deleted). In some embodiments, all data writes are transformed to insertions so that each data may have the associated deletion flag, and data not subject to a deletion request has its flag set to false. By setting the flag, new search results may be returned without including deleted data by consulting the deletion flag (e.g., block 312), garbage collection may be run to remove deleted data and turn off the necessity to check deletion flags (e.g., block 314), or a combination of such operations. Therefore, processing logic may optionally perform garbage collection on the at least one upgraded search system data node to remove, from new data nodes, data marked as deleted from the current search system data nodes (processing block 316).

As discussed above, processing logic performs the upgrade of the software of a distributed search system, including data nodes of the search system with zero downtime. That is, both search system writes (e.g., ingestion of new data into the search system) and reads (e.g., handling of search requests) may continue without interruption or delay during the upgrade. Furthermore, with the assistance of the write orchestration (e.g., dual writes and ingestion), search requests received during an upgrade still reflect a real-time state of transaction data, even for extremely high volume real-time transaction processing systems, such as the commerce platform system discussed herein.

Figure 4:
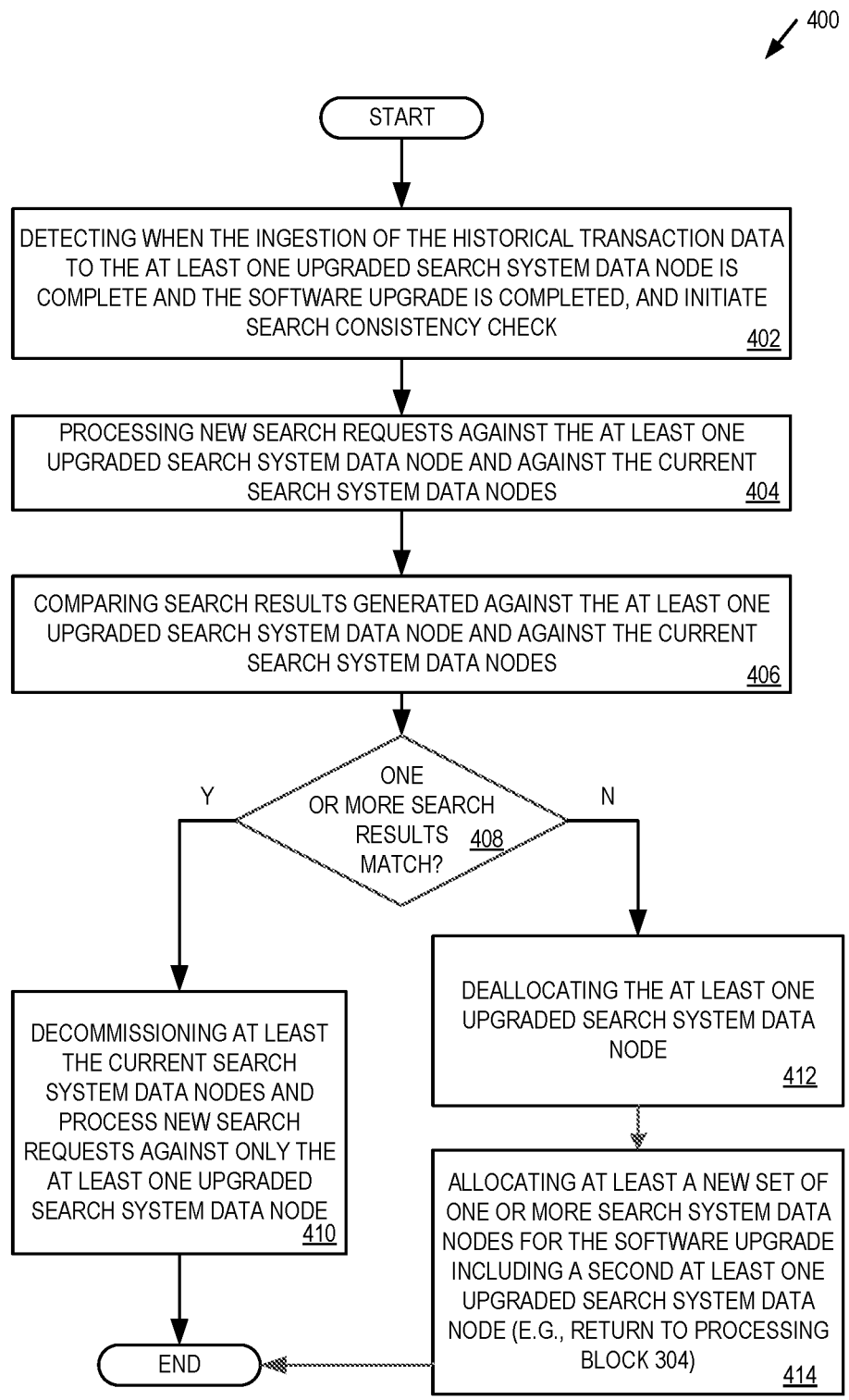
FIG. 4 is a flow diagram of one embodiment of a method for testing accuracy an upgraded search system.

FIG. 4 is a flow diagram of one embodiment of a method 400 for testing accuracy an upgraded search system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200).

Referring to FIG. 4, processing logic begins by detecting when the ingestion of the historical transaction data to the at least one upgraded search system data node is complete and the software upgrade is completed, and initiate search consistency check (processing block 402). In embodiments, processing block 402 may be considered part of processing block 314 discussed above in FIG. 3. However, processing block 402 initiates a process to ensure consistency of search results returned by a new, upgraded search system nodes before responsibility for providing results to merchants is allowed.

Processing logic processes new search requests against the at least one upgraded search system data node and against the current search system data nodes (processing block 404). Processing logic performs the orchestrated dual read to obtain search results using the same search criteria from a current search system cluster and/or current data nodes, and from an upgraded search system cluster and/or upgraded data nodes. Processing logic compares search results generated against the at least one upgraded search system data node and against the current search system data nodes (processing block 406). Comparison, in embodiments, can include determining if a specific (e.g., non-ranked) data query returns the same result using both current and upgraded data nodes. Comparison, in embodiments, can also include determining if a ranked query result have a threshold amount of similarity in the ranked search results. For example, the threshold amount of similarity may include a threshold number of the same results within a second threshold number of returned results (e.g., the top ten result share at least 8 entries), determining that results in a ranked list are within a threshold distance of each other (e.g., results 1-5 are within X results of each other), as well as other methods of comparison of search result consistency indicative of an amount of similarity.

When one or more search results are determined by processing logic to match (processing block 408), such that comparison shows consistency of search results, processing logic decommissions at least the current search system data nodes and process new search requests against only the at least one upgraded search system data node (processing block 410). That is, the current (e.g., prior software version) cluster and/or data nodes may be deallocated, and the dual write and read orchestration modified to direct all reads and writes to the updated cluster and/or data node(s). However, when one or more search results are determined by processing logic not to match (processing block 408), processing logic deallocates the at least one upgraded search system data node (processing block 412). Processing logic then allocates at least a new set of one or more search system data nodes for the software upgrade including a second at least one upgraded search system data node (processing block 414). That is, processing logic deallocates the attempted upgrade as it is deemed unsuccessful in response to determining a lack of consistency of returned search results. Furthermore, the upgrade process may be restarted by re-initiating and returning back to processing block 304 of FIG. 3.

Figure 5:
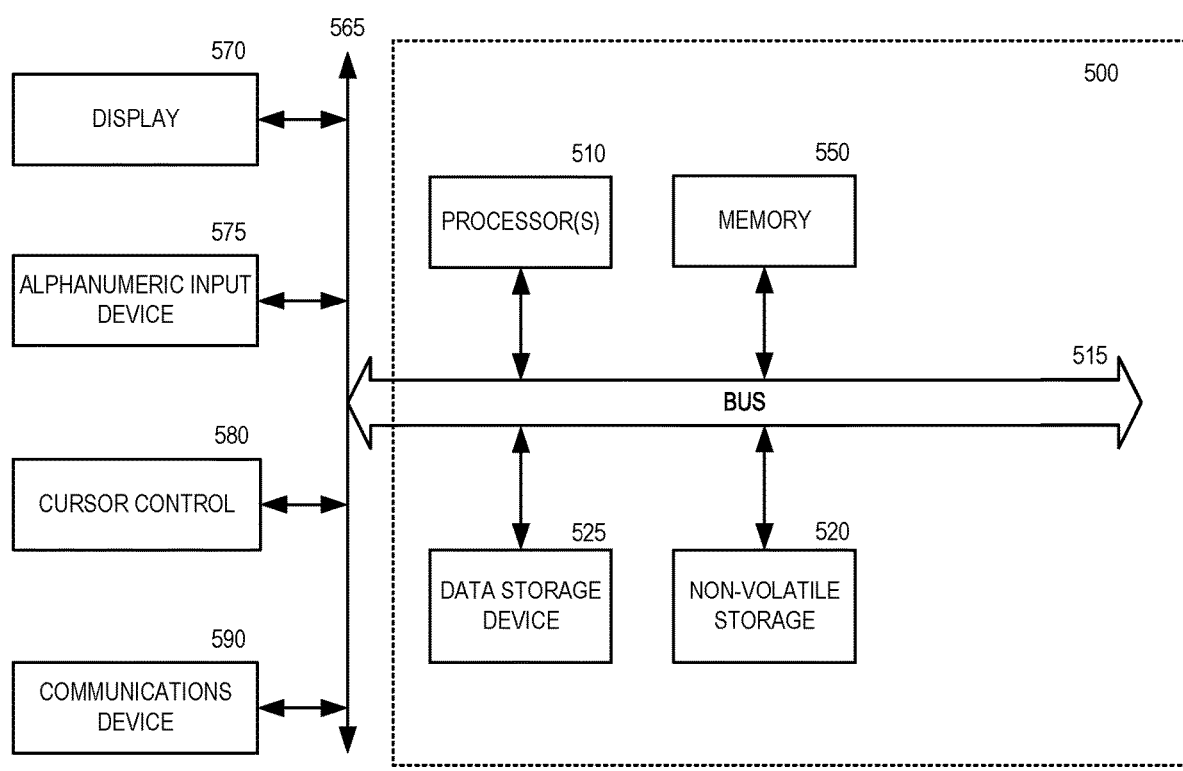
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant system, user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for performing search system upgrades, the method comprising:
   processing, by a computer processing system, a software upgrade for a search system cluster distributed over one or more nodes, the one or more nodes comprising current search system data nodes;
   allocating, by the computer processing system, at least a set of one or more search system data nodes for the software upgrade including at least one upgraded search system data node;
   receiving, by the computer processing system during the software upgrade, transaction data for a transaction processed by the computer processing system, and receiving search requests to be executed by the search system cluster;
   performing, by the computer processing system, ingestion of all historical transaction data comprising a dual write of the transaction data comprising:
      storing and indexing the transaction data in the current search system data nodes; and
      storing and indexing the transaction data separately from the current search system data nodes in the at least one upgraded search system data node; and
   processing, by the computer processing system, the search requests by the search system cluster against both the current search system data nodes and the at least one upgraded search system data node until the software upgrade is determined to be complete when first search results from the current search system data nodes are compared and match second search results from the at least one upgraded search system data node; and
   in response to determining that the software upgrade is complete, decommissioning, by the computer processing system, at least the current search system data nodes and processing new search requests against the at least one upgraded search system data node.

2. The method of claim 1, further comprising:
   performing ingestion of historical transaction data to the at least one upgraded search system data node; and
   when the ingestion of the historical transaction data to the at least one upgraded search system data node is complete and the software upgrade is determined to be complete, decommissioning at least the current search system data nodes and processing new search requests using the at least one upgraded search system data node.

3. The method of claim 2, further comprising:
   accessing one or more historical transaction data from a search system snapshot; and
   performing ingestion of the accessed historical transaction data comprising storing and indexing the accessed historical transaction data in the at least one upgraded search system data node.

4. The method of claim 2, wherein the software upgrade is determined to be complete further comprising:
   determining that all historical transaction data has been ingested by the at least one upgraded search system data node;
   after all historical transaction data has been ingested by the at least one upgraded search system data node, processing one or more new search requests against both the current search system data nodes and the at least one upgraded search system data node;
   comparing first search results returned using the current search system data nodes with second search results returned using the at least one upgraded search system data node; and
   when the first search results match the second search results, determining that the software upgrade is complete.

5. The method of claim 4, wherein comparing the first search results returned using the current search system data nodes with the second search results returned using the at least one upgraded search system data node, further comprises:
   receiving a search request for a specific transaction data; and
   determining a search results match when the specific transaction data is returned in both the first search results match the second search results.

6. The method of claim 4, wherein comparing the first search results returned using the current search system data nodes with the second search results returned using the at least one upgraded search system data node, further comprises:
   receiving a search request for a ranked listing of search results; and
   determining a search results match when a first ranked search result returned using the current search system data nodes has a threshold amount of similarity to a second ranked search result returned using the at least one upgraded search system data node.

7. The method of claim 4, wherein comparing first search results returned using the current search system data nodes with second search results returned using the at least one upgraded search system data node, further comprises:
   comparing search results obtained using the current search system data nodes and using the at least one upgraded search system data node over a period of time; and
   when the search results match over a threshold period of time, determining that the first search results match the second search results.

8. The method of claim 4, further comprising:
   when the first search results do not match the second search results, decommissioning the allocated set of one or more search system data nodes including the at least one upgraded search system data node; and
   restarting the software upgrade by allocating, by the computer processing system, at least a second set of one or more search system data nodes for the software upgrade including at least one second upgraded search system data node.

9. The method of claim 1, wherein the storing and indexing the transaction data in both the current search system data nodes and the at least one upgraded search system data node comprises:
   receiving, by the computer processing system, at least one request to delete identified transaction data from a data store of transaction records;
   transforming the at least one request to delete the identified transaction data to an insertion of the identified transaction data with a deletion flag set to true;
   ingesting the identified transaction data with the deletion flag, including storing and indexing the identified transaction data, by the at least one upgraded search system data node; and
   when the software upgrade is determined to be complete, performing garbage collection to remove any transaction data from the at least one upgraded search system data node with a corresponding deletion flag set to true.

10. The method of claim 1, wherein the processing of the software upgrade for the search system cluster distributed over the one or more nodes and allocating the set of one or more search system data nodes for the software upgrade including the at least one upgraded search system data node, further comprises:
   allocating a new search system cluster that comprises the at least one upgraded search system data node, an upgraded master node, and an upgraded ingest node, wherein the at least one upgraded search system data node, the upgraded master node, and the upgraded ingest node are distributed among one or more processing systems of the computer processing system.

11. The method of claim 1, wherein the processing the software upgrade for the search system cluster distributed over the one or more nodes and allocating the set of one or more search system data nodes for the software upgrade including the at least one upgraded search system data node, further comprises:
   allocating the at least one upgraded search system data node within a current search system cluster that comprises at least one current search system data node, a current master node, and a current ingest node; and
   performing an in-place installation of the software upgrade on the current master node and the current ingest node to respectively update the current master node and the current ingest node to an upgraded master node and an upgraded ingest node.

12. The method of claim 1, wherein the search system cluster comprises a search system executed by the computer processing system.

13. The method of claim 1, wherein the search system cluster comprises a search system remote to the computer processing system.

14. The method of claim 1, wherein the transaction data is generated by the computer processing system and comprises data generated during financial transactions performed by the computer processing system on behalf of one or more merchant systems.

15. A non-transitory computer readable storage medium including instructions that, when executed by a processor, cause the processor to perform operations for performing search system upgrades, the operations comprising;
   processing a software upgrade for a search system cluster distributed over one or more nodes, the one or more nodes comprising current search system data nodes;
   allocating at least a set of one or more search system data nodes for the software upgrade including at least one upgraded search system data node;
   receiving, during the software upgrade, transaction data for a transaction processed by a computer processing system, and receiving search requests to be executed by the search system cluster;
   performing ingestion of all historical transaction data comprising a dual write of the transaction data comprising:
      storing and indexing the transaction data in the current search system data nodes; and
      storing and indexing the transaction data separately from the current search system data nodes in the at least one upgraded search system data node; and
   processing the search requests by the search system cluster against both the current search system data nodes and the at least one upgraded search system data node until the software upgrade is determined to be complete when first search results from the current search system data nodes are compared and match second search results from the at least one upgraded search system data node; and
   in response to determining that the software upgrade is complete, decommissioning at least the current search system data nodes and processing new search requests against the at least one upgraded search system data node.

16. The non-transitory computer readable storage medium of claim 15, further comprising:
   performing ingestion of historical transaction data to the at least one upgraded search system data node; and
   when the ingestion of the historical transaction data to the at least one upgraded search system data node is complete and the software upgrade is determined to be complete, decommissioning at least the current search system data nodes and processing new search requests using the at least one upgraded search system data node.

17. The non-transitory computer readable storage medium of claim 16, wherein the software upgrade is determined to be complete further comprises:
   determining that all historical transaction data has been ingested by the at least one upgraded search system data node;
   after all historical transaction data has been ingested by the at least one upgraded search system data node, processing one or more new search requests against both the current search system data nodes and the at least one upgraded search system data node;
   comparing first search results returned using the current search system data nodes with second search results returned using the at least one upgraded search system data node; and
   when the first search results match the second search results, determining that the software upgrade is complete.

18. The non-transitory computer readable storage medium of claim 15, wherein the processing of the software upgrade for the search system cluster distributed over the one or more nodes and allocating the set of one or more search system data nodes for the software upgrade including the at least one upgraded search system data node, further comprises:
   allocating a new search system cluster that comprises the at least one upgraded search system data node, an upgraded master node, and an upgraded ingest node, wherein the at least one upgraded search system data node, the upgraded master node, and the upgraded ingest node are distributed among one or more processing systems of the computer processing system.

19. The non-transitory computer readable storage medium of claim 15, wherein the processing the software upgrade for the search system cluster distributed over the one or more nodes and allocating the set of one or more search system data nodes for the software upgrade including the at least one upgraded search system data node, further comprises:
   allocating the at least one upgraded search system data node within a current search system cluster that comprises at least one current search system data node, a current master node, and a current ingest node; and
   performing an in-place installation of the software upgrade on the current master node and the current ingest node to respectively update the current master node and the current ingest node to an upgraded master node and an upgraded ingest node.

20. A commerce platform system for performing search system upgrades, comprising:
- a memory; and
- a processor coupled with the memory configured to:
  - process a software upgrade for a search system cluster distributed over one or more nodes, the one or more nodes comprising current search system data nodes,
  - allocate at least a set of one or more search system data nodes for the software upgrade including at least one upgraded search system data node,
  - receive, during the software upgrade, transaction data for a transaction processed by the commerce platform system, and receiving search requests to be executed by the search system cluster;
  - perform ingestion of all historical transaction data comprising a dual write of the transaction data comprising:
    - storing and indexing the transaction data in the current search system data nodes; and
    - storing and indexing the transaction data separately from the current search system data nodes in the at least one upgraded search system data node, and
  - process the search requests by the search system cluster against both the current search system data nodes and the at least one upgraded search system data node until the software upgrade is determined to be complete when first search results from the current search system data nodes are compared and match second search results from the at least one upgraded search system data node; and
- in response to determining that the software upgrade is complete, decommissioning at least the current search system data nodes and processing new search requests against the at least one upgraded search system data node.

\* \* \* \* \*